United States Patent
Lampin et al.

(10) Patent No.: US 10,841,186 B2
(45) Date of Patent: Nov. 17, 2020

(54) METHOD FOR ACCESSING DATA RELATED TO AT LEAST ONE OPERATION IMPLENTED BY A NODE DEVICE OF A NETWORK

(71) Applicant: ORANGE, Paris (FR)

(72) Inventors: Quentin Lampin, Grenoble (FR); Dominique Barthel, Bernin (FR)

(73) Assignee: Orange, Paris (FR)

( * ) Notice: Subject to any disclaimer, the term of this patent is extended or adjusted under 35 U.S.C. 154(b) by 230 days.

(21) Appl. No.: 15/512,826

(22) PCT Filed: Sep. 30, 2015

(86) PCT No.: PCT/FR2015/052611
§ 371 (c)(1),
(2) Date: Mar. 20, 2017

(87) PCT Pub. No.: WO2016/051084
PCT Pub. Date: Apr. 7, 2016

(65) Prior Publication Data
US 2017/0295076 A1    Oct. 12, 2017

(30) Foreign Application Priority Data

Sep. 30, 2014    (FR) ..................................... 14 59288

(51) Int. Cl.
*H04L 12/26*    (2006.01)
*H04L 12/24*    (2006.01)

(52) U.S. Cl.
CPC .......... *H04L 43/04* (2013.01); *H04L 41/0213* (2013.01); *H04L 41/04* (2013.01);
(Continued)

(58) Field of Classification Search
CPC ..... H04W 24/02; H04W 24/08; H04W 24/10; H04L 43/08; H04L 41/0893; H04L 43/04;
(Continued)

(56) References Cited

U.S. PATENT DOCUMENTS

| 6,148,338 | A | 11/2000 | Lachelt et al. |
| 2003/0169761 | A1* | 9/2003 | Duncan ............... H04L 41/0213 |
| | | | 370/449 |
| 2006/0294259 | A1* | 12/2006 | Matefi .................... H04L 12/18 |
| | | | 709/248 |

(Continued)

FOREIGN PATENT DOCUMENTS

EP    1696343 A1 *    8/2006    ............. H04L 41/28

OTHER PUBLICATIONS

Attached please find the Written Opinion for the PCT application PCT/FR2015/052611.

*Primary Examiner* — Chirag R Patel
(74) *Attorney, Agent, or Firm* — Haverstock & Owens LLP (57) ABSTRACT

The invention relates to a method for accessing data related to at least one operation implemented by at least one node device (N1) of a network (R) from a plurality of node devices (N1, N2, N3) of said network, which are capable of communicating via a first communication link (L1). According to the invention, the access method is suitable for receiving a message through which a node device signals, to an observation device, an operation implemented by said node device; for recording at least one piece of information on said operation; and, upon receiving a request from a terminal via a second communication link, for transmitting a response developed from at least part of the recorded information. The invention also relates to a data-transmission method. The invention further relates to an observation device (DT) and to a node device (N1) of a network which implement the access method and the transmission method, respectively.

9 Claims, 4 Drawing Sheets

(52) U.S. Cl.
CPC ............ *H04L 41/069* (2013.01); *H04L 43/08* (2013.01); *H04L 43/16* (2013.01); *H04L 43/18* (2013.01)

(58) Field of Classification Search
CPC . H04L 41/0631; H04L 12/1432; H04L 24/02; G06F 11/30
See application file for complete search history.

(56) References Cited

U.S. PATENT DOCUMENTS

| | | |
|---|---|---|
| 2008/0162592 A1 | 7/2008 | Huang et al. |
| 2010/0214951 A1* | 8/2010 | Takemura ............ H04L 41/0853 370/254 |
| 2010/0257598 A1* | 10/2010 | Demopoulos ......... G06F 21/552 726/13 |
| 2011/0066297 A1* | 3/2011 | Saberi ................... F16K 31/046 700/287 |
| 2011/0075652 A1* | 3/2011 | Ogura ................. H04L 65/4053 370/351 |
| 2011/0087775 A1* | 4/2011 | Lee ....................... H04L 67/104 709/224 |
| 2012/0005542 A1 | 1/2012 | Petersen et al. |
| 2012/0159267 A1* | 6/2012 | Gyorffy .............. G06F 11/0709 714/55 |
| 2013/0114582 A1* | 5/2013 | Husney ................ H04W 4/006 370/338 |
| 2014/0082513 A1 | 3/2014 | Mills et al. |
| 2015/0333992 A1* | 11/2015 | Vasseur ............... H04L 12/4633 370/252 |

* cited by examiner

METHOD FOR ACCESSING DATA RELATED TO AT LEAST ONE OPERATION IMPLENTED BY A NODE DEVICE OF A NETWORK

The field of the invention is that of telecommunications.

The invention relates more particularly to the field of the observation of communication networks while they are operating in order to verify the communication protocol behavior thereof or measure the performance thereof.

It applies particularly to the networks formed by resource-constrained communicating objects.

Known systems make it possible to observe the state of each node of a network. In these systems, a central server, called NOC (Network Operation Center) is informed of operating parameters and performance measurements by explicitly interrogating the nodes of the network, that is to say the communicating objects, through the network in operation. This interrogation is in particular performed by means of specific protocols such as the SNMP protocol (Simple Network Management Protocol).

On the one hand, this technique entails the use of a bandwidth at the network level. The bandwidth used increases with the intensity of the observation.

On the other hand, since the interrogations are asynchronous in relation to the internal changes of state of nodes observed, the interrogation process must be intense to hope to observe all the successive states, but without any guarantee being acquired.

This has the negative effects of consuming significant resources at the observed node level when a fine observation is required.

These systems are well suited to networks of nodes in which the nodes have high bandwidth and energy capacities.

On the other hand, they are not suited to the networks of nodes in which the nodes are constrained in terms of energy and/or bandwidth.

One of the aims of the invention is to remedy the inadequacies/drawbacks of the prior art and/or provide improvements thereto.

To this end, the invention proposes a method for accessing data related to at least one operation implemented by at least one node-forming device of a network of a plurality of devices forming nodes of said network and capable of communicating via a first communication link.

The access method comprises the following steps, implemented by an observation device:
 reception, at at least one second instant, of at least one message by which a node-forming device signals to the observation device at least one operation implemented at at least one first instant by said node-forming device;
 storage of at least one item of information on said operation;
 on reception of a request related to at least one operation implemented by at least one node-forming device, from a terminal, via a second communication link, transmission of a response to said request, said response being generated from at least a part of the information stored.

Messages transmitted by node-forming devices of a network are received by an observation device. Each message received signals the performance of at least one operation by a node-forming device of a network of a plurality of devices forming nodes of this network.

Each message received is transmitted by a node-forming device of a network of a plurality of node-forming devices of this network, which thus signals the performance of one or more operations.

A user can then interrogate the observation device and obtain information on all or some of the operations performed by one or more node-forming devices of the network.

The sending of a request to the observation device makes it possible to obtain information similar to that which would be obtained by successive interrogation of the node-forming devices. The sending of this request to the observation device, and not to the node-forming devices, makes it possible to save on the resources of the node-forming devices.

In addition, a single request makes it possible to obtain information related to several nodes.

According to a particular feature of the access method, the time interval between the first instant and the second instant is less than a predefined threshold value.

The time interval between the performance of an operation and the reception by the observation device of the message signaling this operation is less than a predefined threshold value. The observation device is thus informed of the operations performed by the node-forming devices as and when these operations are performed.

A message signaling an operation is transmitted by the node-forming device of the network in synchronism with the implementation of the operation signaled.

In the case where the threshold value is low compared to the typical period of change of the system, the observation device is informed, in real time, of the implementation of an operation by a node-forming device.

According to a particular embodiment of the access method, said message is received via a communication link set up between the observation device and a relay device capable of communicating with the node-forming device.

The use of a relay device, capable of receiving a message transmitted by a node-forming device of a network and of retransmitting it to the observation device, makes it possible to use means that are inexpensive in terms of resources to transmit the message at the node-forming device level and thus disturb the operation of the node-forming device as little as possible.

According to a feature of this embodiment, the message received by the observation device contains an identifier of the node-forming device inserted by said relay device and/or a date inserted by the relay device.

The insertion of a node-forming device identifier, at the relay device level rather than at the node-forming device level, makes it possible to save on the resources of the node-forming device.

The insertion of a date at the relay device level rather than at the node-forming device level, also makes it possible to save on the resources of the node-forming device.

According to a particular embodiment of the access method, used alone or in combination with the other embodiments, said at least one item of information on said operation is stored in association with a date included in said time interval.

The storage of a date in association with the item of information on an operation makes it possible to be able to observe the behavior of one or more devices over time.

The date stored is, according to the embodiments, the date of transmission of the message by a node, the date of reception of the message by a relay device, the date of reception of the message by the observation device.

According to a particular feature of the access method, the date stored in association with the message in the storage step is the date of reception of the message or a date contained in the message received.

The invention relates also to a method for transmitting data related to at least one operation implemented by at least one node-forming device of a network of a plurality of node-forming devices of said network and capable of communicating via a first communication link.

The transmission method comprises a step of transmission, by a node-forming device, at at least one second instant, of at least one message signaling at least one operation implemented at at least one first instant by said node-forming device.

The messages are transmitted spontaneously by the node-forming devices which thus signal the execution of the operations that they perform.

According to a particular feature of the transmission method, said at least one message is transmitted via a third communication link, different from said first communication link.

Thus, the node-forming devices of the network communicate with the other devices of the network via a first link and signal the implementation of the operations that they perform via another link. The use of a communication link different from the first link to signal the implementation of an operation makes it possible to not disturb the exchange of messages between the different node-forming devices of the network.

The invention relates also to an observation device comprising:
- a module for reception, at at least one second instant, of at least one message by which a node-forming device of a network of a plurality of node-forming devices of said network and capable of communicating via a first communication link, signals at least one operation implemented at at least one first instant by said node-forming device;
- a module for storing at least one item of information on said operation;
- a sending module for transmitting, on reception of a request related to at least one operation implemented by at least one node-forming device, from a terminal, via a second communication link, a response to said request, said response being generated from at least a part of the information stored.

The observation device collects the messages signaling the execution of operations implemented by a plurality of devices of a network. Using the information received, it can then respond to the requests transmitted by a terminal without disturbing the devices of the network.

The invention relates, also to a node-forming device of a network of a plurality of node-forming devices of said network and capable of communicating via a first communication link.

This node-forming device comprises a module for transmitting, at at least one second instant, at least one message signaling at least one operation implemented at at least one first instant by said node-forming device.

According to a preferred implementation, the different steps of the access method, respectively of the transmission method, according to the invention, are implemented by a piece of software or a computer program.

The invention thus relates to a piece of software or program, likely to be executed by a computer or by a data processor, this software/program comprising instructions for controlling the execution of the steps of an access method or of a transmission method. These instructions are intended to be stored in a memory of a computer device, loaded then executed by a processor of this computer device.

This software/program can use any programming language, and be in the form of source code, object code, or intermediate code between source code and object code, such as in a partially compiled form, or in any other desirable form.

The computer device can be implemented by one or more physically distinct machines and overall has the architecture of a computer, including components of such an architecture: data memory (memories), processor(s), communication bus, hardware interface (s) for connecting this computer device to a network or another equipment item, user interface(s), etc.

The invention relates also to an information medium that can be read by a data processor, and comprising instructions for a program as mentioned above. The information medium can be any entity or device capable of storing the program.

Other features and advantages of the present invention will become apparent from the following description of an embodiment given as a nonlimiting example, with reference to the attached drawings, in which.

The invention is implemented by means of software and/or hardware components. In this respect, the term "module" can correspond in this document equally to a software component, and to a hardware component or to a set of hardware and/or software components, capable of implementing a function or a set of functions, according to what is described hereinbelow for the module concerned.

A software component corresponds to one or more computer programs, one or more subroutines of a program, or more generally to any element of a program or of a piece of software. Such a software component is stored in memory then loaded and run by a data processor of a physical entity (terminal, server, gateway, set-top-box, router, etc.) and is capable of accessing the hardware resources of this physical entity (memories, storage media, communication bus, electronic input/output boards, user interfaces, etc.).

Similarly, a hardware component corresponds to any element of a hardware assembly. It can be a programmable hardware component or one with integrated processor for the execution of software, for example an integrated circuit, a chip card, an electronic board for executing firmware, etc.

A first embodiment of a transmission method and of an access method will now be described with reference to FIGS. 1 to 3.

Figure 1:
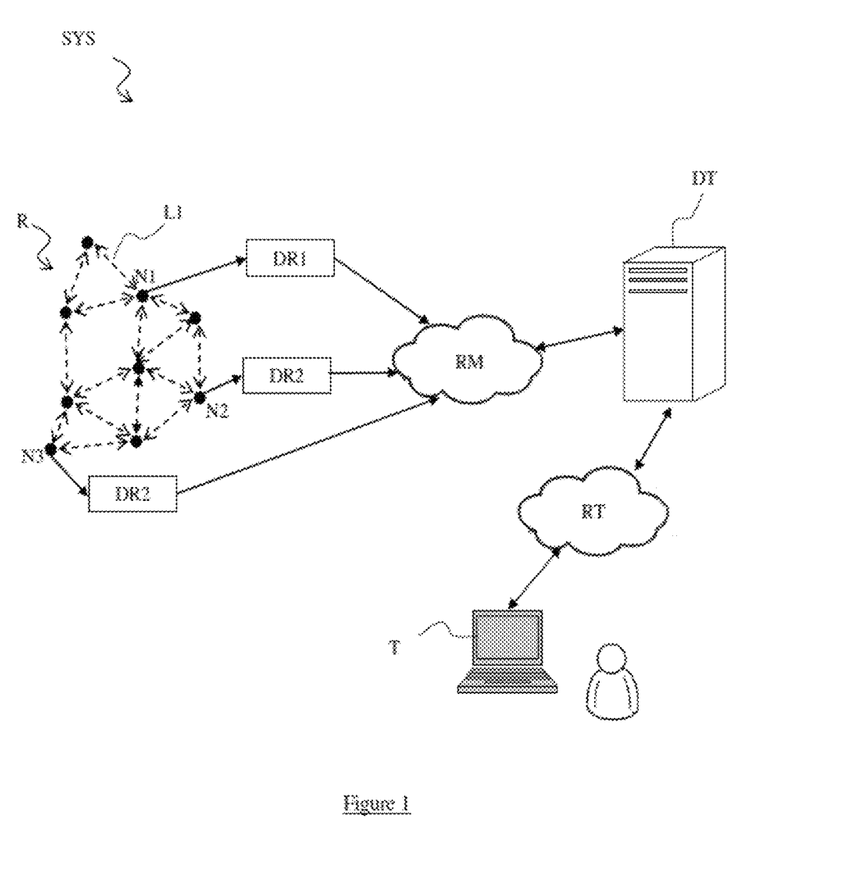
FIG. 1 is a general diagram illustrating a system according to a first embodiment of the invention.

FIG. 1 represents a system SYS comprising a plurality of devices N1, N2, N3 . . . distributed in a geographic area, an observation device DT and a terminal T.

A device of the plurality is for example a sensor, for example a measurement sensor, such as a water or electricity meter.

More generally, such a device is a communicating object, that is to say a device capable of transmitting data to one or more other devices of the plurality and/or of receiving data from another device of the plurality.

Each device is thus capable of communicating with one or more other devices of the plurality via a communication link L1.

The communication link L1 represents a first communication link in the meaning of the invention.

The communication link L1 is for example a wireless link, for example a radio link.

Alternatively, the communication link L1 is a link of Wifi type or a link of Bluetooth type or even a wired link.

The devices N1, N2 . . . are thus organized into a communication network N and each device N1, N2, N3 of the plurality is a node-forming device of this network R.

Each device of the plurality is capable of communicating with another device of the plurality either directly or via one or more other devices of the plurality.

Each device of the plurality is also capable of transmitting data intended for the observation device DT.

In the embodiment described, the data transmitted by a device of the plurality to the observation device DT pass through a relay device associated with this device of the plurality.

In the embodiment described, a relay device is associated with each node-forming device and each relay device is associated with a single device of the plurality.

Alternatively, one relay device is associated with several node-forming devices.

For the purposes of clarity of FIG. 1, only relay devices DR1, DR2, DR3 respectively associated with the devices N1, N2, N3 have been represented.

The relay devices are capable of communicating with the observation device DT via a communication network RM.

The terminal T is a terminal of an operator, for example a computer of PC (personal computer) type. The terminal T is capable of communicating with the observation device DT via a communication network RT.

The communication network RT is for example the internet network.

Alternatively, the communication network RT is network of Ethernet type.

The terminal T is capable of communicating with the observation device DT via a communication link LT.

The communication link LT between the terminal T and the observation device DT is a two-way link.

The communication link LT represents a second communication link within the meaning of the invention.

Alternatively, the observation device DT and the terminal T communicate via a dedicated communication link, for example a wired link.

Figure 2:
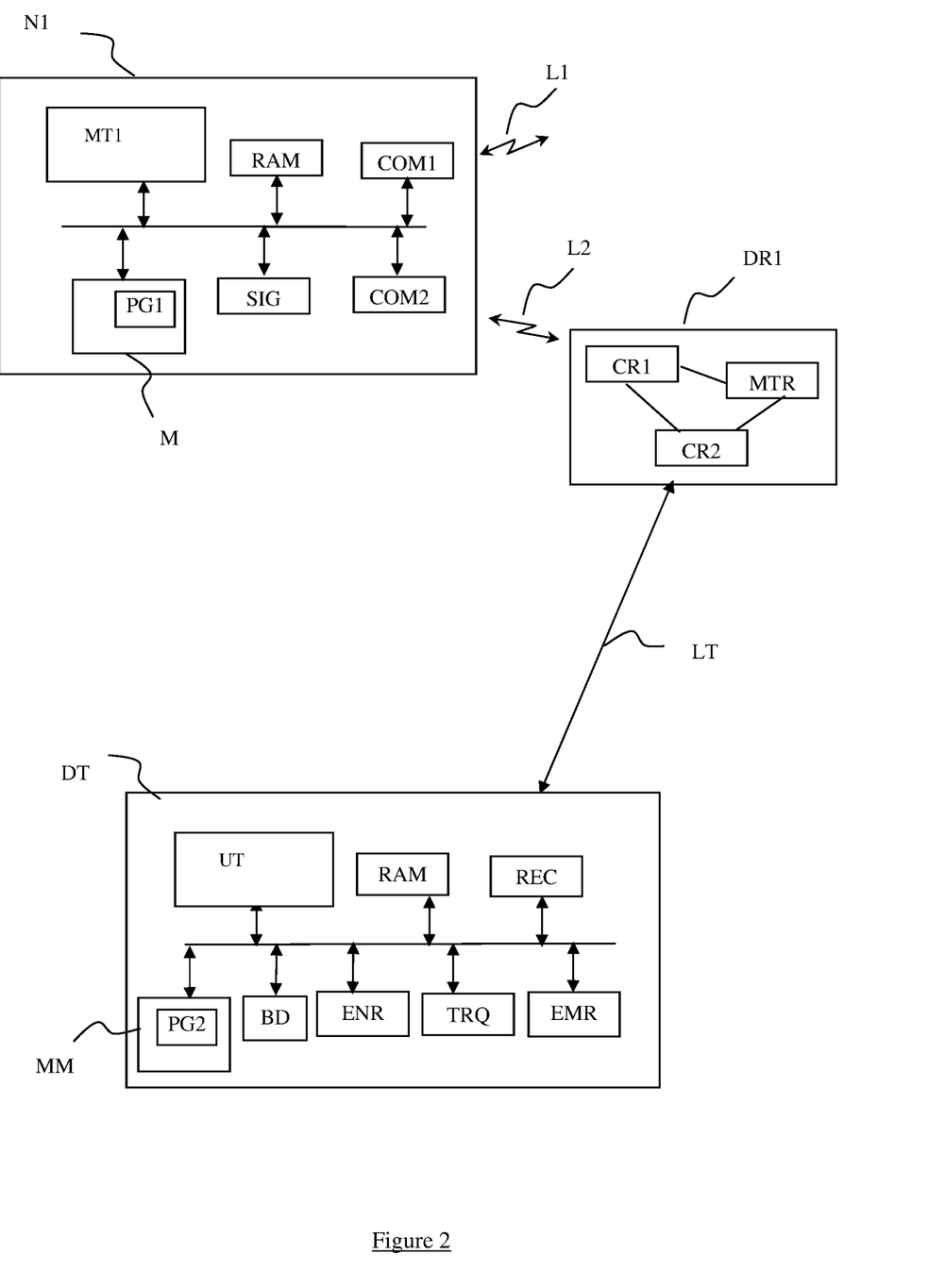
FIG. 2 is a block diagram representing a node-forming device of a network, a relay device and an observation device according to an embodiment of the invention.
Figure 3:
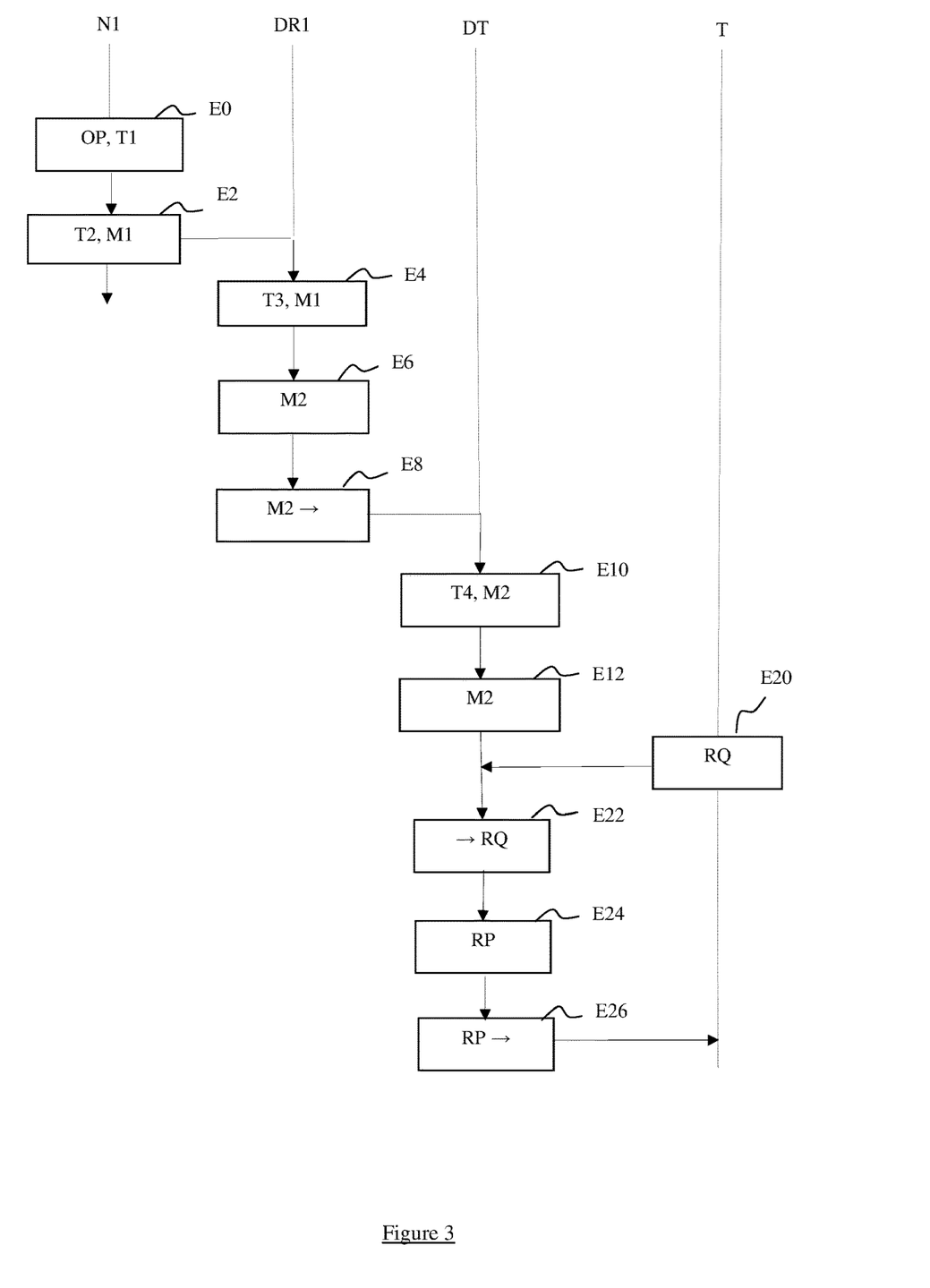
FIG. 3 is a flow diagram illustrating the different steps of a transmission method and of an access method according to a first embodiment of the invention.

FIG. 2 is a block diagram representing a device of the plurality, for example the device N1, the relay device DR1 associated with this device N1 and the observation device DT of the system SYS.

The device N1 comprises, as is known, in particular a processing unit MT1 equipped with a microprocessor, one or more storage memories M, for example of EEPROM type, and a random access memory of RAM type.

The node-forming device N1 also comprises a first communication module COM1 for communicating with one or more other devices of the plurality via the first communication link L1.

It also comprises a second communication module COM2 for communicating with the relay device DR1.

The device N1 and the associated relay device DR1 communicate via a communication link L2, for example a near-field wireless link.

The communication link L2 represents a third communication link within the meaning of the invention.

In the embodiment described, the third link L2 is different from the first link L1.

For example, the first communication link L1 is a radio link of a first predetermined frequency and the communication link L2 between the device N1 and the associated relay device DR1 is a radio link of a second predetermined frequency.

Alternatively, the first communication link L1 is a wireless link of Wifi, Bluetooth or other such type, or even a wired link.

Also, alternatively, the communication link L2 is a near-field wireless link, a wireless link of Wifi or Bluetooth type, a wired link, etc.

Also, alternatively, the node-forming device N1 and the relay device DR1 communicate via the first communication link L1.

The storage memory M comprises registers storing a computer program PG1 comprising program instructions suitable for implementing a data transmission method according to an embodiment of the invention described below with reference to FIG. 3.

The node-forming device N1 also comprises a signaling module SIG.

The relay device DR1 comprises a first communication module CR1, a second communication module CR2 and a processing module MTR.

The observation device DT comprises a processing unit UT equipped with a microprocessor, one or more storage memories NM, for example of EEPROM type, and a random access memory of RAM type.

The observation device DT comprises in particular a storage memory BD.

The observation device DT also comprises a reception module REC, a recording module ENR, a request processing module TRC and a communication module EMR.

The observation device DT can comprise, conventionally and non-exhaustively, the following elements: a keyboard, a display screen, a display module for displaying on the display screen, etc.

The storage memory MM comprises registers storing a computer program PG2 comprising program instructions suitable for implementing a data access method according to an embodiment of the invention described below with reference to FIG. 3.

An embodiment of a transmission method and of an access method implemented in the system SYS will now be described with reference to FIG. 3.

In a preliminary first step E0, the device N1 executes, that is to say implements, an operation OP, at a first instant T1.

The operation performed is for example a sending of data to one or more devices of the network R or a reception of data from another node-forming device of the network R or even a change of internal state of the device.

Figure 4:
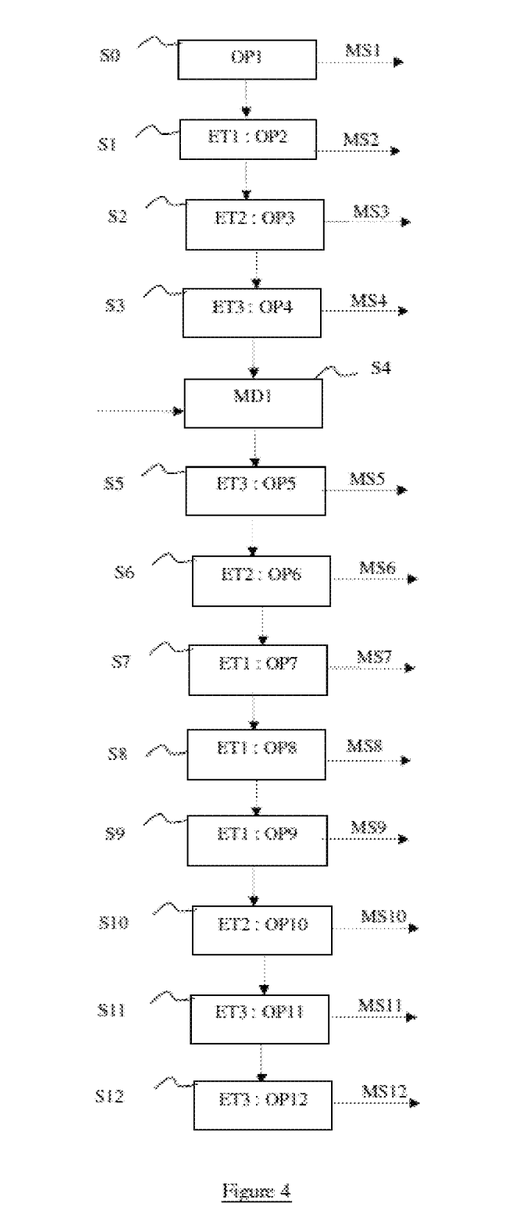
FIG. 4 is a flow diagram illustrating the different steps of a transmission method according to a second embodiment of the invention.

Particular examples of operations implemented are described hereinbelow in the description with reference to FIG. 4.

In a step E2, the signaling module SIG of the device N1 generates a first message M1 and orders the transmission, by the second communication module COM2, of the message generated M1.

The message M1 enables the device N1 to signal the implementation of the operation OP.

The message M1 is for example transmitted simultaneously with the implementation of the operation OP.

The message M1 is transmitted spontaneously by the device N1, via the communication link L2.

The message M1 contains an identifier of the operation OP implemented.

Alternatively, the message M1 also comprises an identifier of a functional entity of the node-forming device having implemented the operation OP and/or an identifier of the device N1.

For example, the functional entities are software entities capable of generating the different layers of a protocol stack.

Also, alternatively, the message M1 comprises the date T1 of implementation of the operation OP by the device N1.

The step E2 is performed at an instant T2.

The message M1 is received at an instant T3, by the communication module CR1 of the relay device DR1 associated with the device N1 in a step E4.

In the embodiment described, the step E4 is followed by a step E6 during which the processing module MTR of the relay device DR1 constructs a second message M2 as a function of the message M1 received.

The second message M2 contains, in addition to the data contained in the message M1, an identifier ID1 of the device N1.

The process module MTR of the relay device DR1 can also include, in the second message M2, the date T3 of reception by the relay device DR1 of the first message M1.

In a step E8, the processing module MTR of the relay device DR1 orders the transmission of the second message M2 by the communication module CR2 of the relay device to the observation device DT.

The second message M2 is received at an instant T4, by the reception module REC of the observation device DT, in a step E10.

The step E10 is followed by a step E12 during which all or part of the information contained in the second message M2 is recorded by the recording module ENR of the observation device DT, in a memory of the observation device DT, for example the memory ED.

Thus, the recording module ENR of the device N1 records at least one item of information on the operation OP.

Alternatively, this information is recorded in a memory external to the observation device DT and accessible to this observation device DT.

The recorded information contains a date.

In the embodiment described in which the second message M2 does not contain a date, the information is recorded in association with the date of reception T4 of the message M2 by the observation device DT.

The instant T4 represents a second instant within the meaning of the invention.

In the embodiment described, the time interval between the instant T1 and the instant T4 is less than a predefined threshold value VS.

In the case where the threshold value VS is low, the observation device DT is informed, in real time, of the implementation of the operation OP.

The threshold value VS is in particular considered to be low if the operation OP is signaled as soon as it is implemented, that is to say if the time interval between the instants T1 and T2 can be considered negligible.

The steps E0 to E12 are reiterated upon the implementation of one or more other operations by one of the node-forming devices of the network R.

Thus, messages from the device N1 or from other devices of the network R are received by the observation device DT and recorded in the memory ED.

The memory ED thus contains dated messages related to a plurality of operations performed by one or more node-forming devices of the network R.

In a step E20, the terminal. T sends a request RQ to the observation device DT, via the communication link LT.

The request RAJ contains, for example, one or more identifiers of node-forming devices of the network R.

It can also comprise one or more dates, for example two dates defining a time interval.

The data contained in the request RQ are, for example input by the user of the terminal T, by means of a graphical interface displayed on a screen of the terminal and a user interface.

The request RQ is received by the communication module EMR of the observation device DT in a step E22.

In a step E24, the request processing module TRQ of the observation device DT accesses the memory ED and generates a response to the request RQ as a function of the data contained in the request RQ and of at least a part of the information recorded in the memory ED.

The request process module TRQ of the observation device DT then orders the transmission by the communication module EMR of the observation device DT of a response RP to the request RQ. The response RP is transmitted to the terminal T via the communication link LT in a step E26.

For example, the request RQ contains an identifier of a node and values defining a time interval and the response RP contains the successive states taken by the node during this interval.

Alternatively, the request RQ makes it possible to obtain a trajectory actually followed by a data packet in the network R.

The steps E0 and E2, implemented by the device N1, represent the steps of the transmission method.

The steps E10, E12, E22, E24 and E26, implemented by the observation device DT, represent the steps of the access method.

In the embodiment described, the messages signaling operations implemented within a node-forming device pass between the node-forming device and the observation device DT, via a relay device.

As a variant, the messages are transmitted via the first communication link and the network R and received by the observation device DT, without passing through a relay device.

A second embodiment of a data transmission method implemented by a node-forming device N1 of a network R of a plurality of devices will now be described with reference to FIG. 4.

In this embodiment, the device N1 comprises several functional entities, for example 3 functional entities ET1, ET2 and ET3.

The entity ET1 is for example an application entity capable of processing application data received or to be transmitted.

The entity ET2 is for example an entity capable of encapsulating the application messages originating from the entity ET1 and of decapsulating the application messages intended for the entity ET1.

The entity ET3 is for example an entity capable of receiving and of transmitting signals over the communication link L1, that is to say the signals received from another device of the network R or transmitted to another device of the network R.

In a preliminary initialization step S0, for example following the installation and the launching of the device N1, the device N1 implements an initialization operation OP1 and signals the implementation of this initialization operation OP1 by sending a message MS1 to the observation device DT. The device N1 thus signals its presence to the observation device DT.

The message MS1 contains an "entity bootstrap" identifier of the operation OP1 and an identifier of the device N1.

Also, in the initialization phase, each of the entities ET1, ET2 and ET3 implements an initialization operation.

More specifically, in a step S1, the entity ET1 implements an initialization operation OP2 and triggers the sending, by the device N1, of a message MS2 to the observation device DT. The message MS2 contains the "entity bootstrap" operation identifier and an identifier IdE1 of the entity ET1.

In a step S2, the entity ET2 implements an initialization operation OP3 and triggers the sending, by the device N1, of a message MS3 to the observation device DT. The message MS3 contains the "entity bootstrap" operation identifier and an identifier IdE2 of the entity ET2.

In a step S3, the entity ET3 implements an initialization operation OP4 and triggers the sending, by the device N1, of a message MS4 to the observation device DT. The message MS4 contains the "entity bootstrap" operation identifier and an identifier IdE3 of the entity ET3.

In a step S4, following the steps S0 to S3, the device N1 receives a signal representative of a data message MD1 from another node-forming device of the network R.

The message MDI is received by the entity ET3 of the device N1. In a step S5, the entity ET3 signals the implementation of a data reception operation OP5 by ordering the sending of a message MS5 to the observation device DT. The message MS5 contains a "frame receive" operation identifier and an identifier IdE3 of the entity ET3.

The entity ET3 demodulates the signal received and transmits the demodulated signal to the entity ET2. In a step S6, the entity ET2 implements a signal acquisition operation OP6 and signals the operation OP6 by sending a message MS6 containing a "frame notify" operation identifier and the identifier IdE2 of the entity ET2.

Following the acquisition of the signal, the entity ET2 transmits to the entity ET1 all or part of the data contained in the message MD1. The entity ET1 receives the data transmitted by the entity ET2 and signals an operation OP7 of acquisition of these data by sending a message MS7 containing a "frame notify" operation identifier and the identifier IdE1 of the entity ET1 (step S7).

In a step S8, the entity ET1 analyzes the data transmitted by the entity ET2 and signals this analysis operation OP8 by sending a message MS8 containing a "frame consume" operation identifier and the identifier IdE1 of the entity ET1.

In a step S9, the entity ET1 of the device N1 generates a new data message MD2 and signals this data generation operation OP9 by sending a message MS9 containing a "frame produce" operation identifier and the identifier IdE1 of the entity ET1.

In a step S10, the entity ET1 transmits the data message MD2 to the entity ET2 and the entity ET2, having received the data message MD2, signals an operation OP10 of acquisition of the message MD2 by sending a message MS10 containing a "frame notify" operation identifier and the identifier IdE2 of the entity ET2.

The entity ET2 encapsulates the data message MD2 and transmits the encapsulated message to the entity ET3. Following the reception of the encapsulated message, the entity ET3 signals an operation OP11 of acquisition of the encapsulated message by sending a message MS11 containing a "frame notify" operation identifier and the identifier IdE3 of the entity ET3 (step S11).

In a step S12, the entity ET3 sends a radio signal corresponding to the data message MD2 and signals this operation OP12 by sending a message MS12 containing a "frame transmit" operation identifier and the identifier IdE3 of the entity E3.

The observation device DT thus receives, in succession, the messages MS1, MS2 . . . MS12.

A user can then, by interrogating the observation device DT, from the terminal T for example, know the different operations performed by the device N1.

In the embodiment described, the operations implemented and signaled by the node-forming devices are the declaration of presence of a node in the network, the declaration of presence of an entity of a node, the sending of data, the reception of data, the acquisition of data by an entity.

Other operations can be signaled.

For example, operations that are signaled relate to a node, to an entity of a node, to a link between two entities of a node or even to a data frame, that is to say application data.

The operations that are signaled are for example as follows:
 the declaration of the presence of a node, of an entity, of a link or of a frame,
 the declaration of a state of a node, of an entity, of a link or of a frame,
 the updating of a state of a node, of an entity, of a link or of a frame,
 the deletion of a node, of an entity, of a link or of a frame,
 the sending or reception of a frame or even the processing of a frame on an entity.

The format of the messages signaling an operation is for example standardized.

Each message signaling an operation contains, for example, a node and/or entity identifier on 32 bits, an operation identifier on 8 bits and possibly a field containing additional information.

In the exemplary embodiments described, each message transmitted to the observation device DT signals a single operation.

Alternatively, such a message can signal several operations.

The invention claimed is:

1. A method for accessing data related to at least one operation implemented by at least one device of a network of a plurality of devices forming nodes of said network and capable of communicating with each other via a first communication link, characterized in that the method comprises, implemented by an observation device:
 reception, of at least one message from at least one device of the plurality of devices, said message being received at a second instant and signaling to the observation device at least one operation implemented by said device of the plurality of devices at a first instant, wherein the time interval between the first and the second instant being less than a predefined threshold value indicates that the observation device is informed in real time;
 storage of at least one item of information on said operation;
 on reception of a request related to at least one operation implemented by at least one device of the plurality of devices, from a terminal that is not part of the plurality of devices, via a second communication link, transmission of a response to said request, said response being generated from at least a part of the information stored.

2. The access method as claimed in claim 1, in which said message is received via a communication link set up between the observation device and a relay device capable of communicating with the device.

3. The access method as claimed in claim 2, in which the message received contains an identifier of the device inserted by said relay device and/or a date inserted by the relay device.

4. The access method as claimed in claim 1, in which said at least one item of information on said operation is stored in association with a date included in said time interval.

5. The access method as claimed in claim 1, in which the date stored in association with the message in the storage step is the date of reception of the message or a date contained in the message received.

6. The method of claim 1 wherein said message signals at least one of: a sending of data to at least one other device of the plurality of devices; or a reception of data from another device of the plurality of devices.

7. An observation device, comprising:
a module for reception of at least one message from at least one device of a plurality of devices of a network, said message being received at a second instant and signaling to the observation device at least one operation implemented by said device of the plurality of devices at a first instant, wherein the plurality of devices form nodes of said network and are capable of communicating with each other via a first communication link, and further wherein the time interval between the first and the second instant being less than a predefined threshold value indicates that the observation device is informed in real time;
a module for storing at least one item of information on said operation;
a sending module for transmitting, on reception of a request related to at least one operation implemented by at least one device of the plurality of devices, from a terminal that is not part of the plurality of devices, via a second communication link, a response to said request, said response being generated from at least a part of the information stored.

8. A non-transitory computer-readable medium storing a computer program product comprising instructions for implementing an access method, when loaded and executed by a processor, the access method for accessing data related to at least one operation implemented by at least one device of a network of a plurality of devices forming nodes of said network and capable of communicating with each other via a first communication link, the method comprising, implemented by an observation device:
reception, of at least one message from at least one device of the plurality of devices, said message being received at a second instant and signaling to the observation device at least one operation implemented by said device of the plurality of devices at a first instant, wherein the time interval between the first and the second instant being less than a predefined threshold value indicates that the observation device is informed in real time;
storage of at least one item of information on said operation;
on reception of a request related to at least one operation implemented by at least one device of the plurality of devices, from a terminal that is not part of the plurality of devices, via a second communication link, transmission of a response to said request, said response being generated from at least a part of the information stored.

9. A non-transitory information medium that can be read by a data processor, and comprising instructions for a program for executing an access method for accessing data related to at least one operation implemented by at least one device of a network of a plurality of devices forming nodes of said network and capable of communicating with each other via a first communication link, the method comprising, implemented by an observation device:
reception, of at least one message from at least one device of the plurality of devices, said message being received at a second instant and signaling to the observation device at least one operation implemented by said device of the plurality of devices at a first instant, wherein the time interval between the first and the second instant being less than a predefined threshold value indicates that the observation device is informed in real time;
storage of at least one item of information on said operation;
on reception of a request related to at least one operation implemented by at least one device of the plurality of devices, from a terminal that is not part of the plurality of devices, via a second communication link, transmission of a response to said request, said response being generated from at least a part of the information stored.

* * * * *